United States Patent [19]

Feamster et al.

[11] Patent Number: 5,235,586
[45] Date of Patent: Aug. 10, 1993

[54] COMPUTER SYSTEM UTILIZING COMPACT INTELLIGENT DISKS

[75] Inventors: Scott Feamster, Atherton; Keith Klemba, Santa Clara, both of Calif.

[73] Assignee: Hewlett-Packard Company, Palo Alto, Calif.

[21] Appl. No.: 802,207

[22] Filed: Dec. 4, 1991

[51] Int. Cl.⁵ .............................................. G11B 7/24
[52] U.S. Cl. ..................................... 369/100; 369/124; 369/112; 369/77.2
[58] Field of Search ............... 369/100, 272, 273, 276, 369/124, 54, 58, 77.2, 112, 121, 13; 235/492

[56] References Cited

U.S. PATENT DOCUMENTS 4,933,926 6/1990 Tabei et al. .................... 369/100
5,051,950 9/1991 Evans, Jr. et al. ............... 365/109

Primary Examiner—Paul M. Dzierzynski
Assistant Examiner—Kiet T. Nguyen
Attorney, Agent, or Firm—Roland I. Griffin; Alan H. Haggard

[57] ABSTRACT

A computer system comprising a removable optical disk having active circuitry thereon and a disk player is disclosed. The optical disk includes a storage medium for storing data on one side and active circuitry for processing the data on the other side. The disk cartridge includes most of the high speed components of the computer system, while the disk player includes those components which are least likely to change over time. By combining the active circuitry with the data and programs to be processed thereby on a single disk cartridge, the problems associated with maintaining and configuring the system are substantially reduced compared to prior art systems.

15 Claims, 7 Drawing Sheets

COMPUTER SYSTEM UTILIZING COMPACT INTELLIGENT DISKS

FIELD OF THE INVENTION

The present invention relates to computer systems, and more particularly, to a computer system utilizing disk drives having active logic contained on the disk cartridge.

BACKGROUND OF THE INVENTION

The continuing improvements in semiconductor fabrication techniques have made possible the rapid evolution of computer systems. In addition to providing significantly more powerful computer systems, the variety of computing hardware and software available to the average computer user has also increased substantially and is expected to increase further. While these improvements have greatly increased the utility of computers, they have made it difficult for the average user to configure and maintain an up-to-date system.

The demand for computer technology has shifted from systems expertise to information expertise. Although users' demands for computer systems continue to increase, this demand is emphasizing greater user friendliness and application portability. Users want to spend more time understanding business information and less time understanding system complexities. However, system complexity continues to increase as global markets and competition compel the management of worldwide information. Thus users find themselves in a dilemma: they want increasingly diverse information from increasingly complex computer systems, but these systems require sophisticated configuration skills that the user does not want to acquire.

To take advantage of the improvements, the computer user must update his or her system hardware and software on almost an annual basis. While some of these updates may be performed by changing a few components or adding new versions of existing programs, many of the hardware advances may only be fully utilized by replacing the entire computer system. The typical individual user computer system consists of a power supply, a keyboard, a monitor, and a chassis in which a motherboard is mounted together with one or more peripheral cards. The motherboard includes the central processing unit, memory, and bus structure over which the peripheral cards communicate with the central processing unit. Simple upgrades such as increasing the memory capacity of the system can be performed by adding memory chips to sockets on the motherboard and changing the configuration information to allow this memory to be utilized.

However, major improvements typically require the motherboard to be replaced. The motherboards are typically configured for some maximum hardware configuration and operating speed. Major hardware improvements often require that the motherboard operate at a speed in excess of that for which it was designed. Furthermore, new generations of computing hardware often require bus structures that differ from that on existing motherboards.

The typical computer user is not technically competent to make such hardware modifications. In fact, the typical computer user has great difficulty making even minor upgrades such as adding memory chips to his or her system. As a result, the user often postpones upgrading his or her system until improvements in technology justify replacing the entire computer. As a result, the rate at which new improvements penetrate the computer market is reduced. In addition, the cost of upgrading a system is increased, because the entire system including the computer enclosures and power supplies is replaced instead of merely replacing the components in need of upgrading.

The process of upgrading computer systems is further complicated by the need to reload and reconfigure the computer software whenever a major system upgrade is performed. The process of reconfiguring the software, while being somewhat less complicated than performing major system upgrades, also requires a level of competence beyond that of the typical computer user. The variety of hardware platforms on which any given piece of software may be required to operate is too large for software manufacturers to provide software versions that are optimally tuned for each platform. In addition, the software manufacturer must assume that the platform may change during the life of the software, as some users will modify the hardware with upgrades. To alleviate this problem, software manufacturers tend to compromise software performance to obtain systems that are capable of running on a large variety of hardware configurations without requiring extensive configuration by the end user.

The advances in semiconductor technology have also made possible the introduction of special purpose computing hardware that provides even greater improvements in speed and cost effectiveness for certain types of problems. For example, parallel processing techniques may be used to substantially increase the speed of searching in database operations, provided the database software has been configured to take advantage of this type of processing. To fully take advantage of such special purpose hardware, the user must have access to different computing platforms for different types of problems. This significantly increases the cost and complexity of the computer environment. As a result, the potential advantages of such special purpose hardware have not been realized in practice.

The extent to which computers have permeated the workplace places a special burden on individuals who must perform their work in a number of different geographic locations. The data utilized by these users can be transported conveniently over network connections or via portable disk cartridges. Unfortunately, lightweight portable computing platforms with all the features of normal desktop computers have not yet become cost effective for many applications. Hence, the traveling user must often maintain computers at two or more physical locations. The problems of assuring that the computer hardware at one location remains compatible with that at the other locations places an added burden on such traveling computer users.

Broadly, it is the object of the present invention to provide an improved computer system.

It is another object of the present invention to simplify the hardware and software configurations of computer systems.

It is a further object of the present invention to provide a computer system in which the hardware and software may be upgraded without requiring the computer user to alter hardware or perform on site configuration of the hardware or software.

It is yet another object of the present invention to provide a computer system that may be more easily transported between physical locations than prior art portable computer systems.

It is a still further object of the present invention to provide a computer system that provides the user with access to special purpose computing hardware in those applications that would benefit from such hardware.

These and other objects of the present invention will become apparent to those skilled in the art from the following detailed description of the invention and the accompanying drawings.

SUMMARY OF THE INVENTION

The present invention comprises a computer system having two main components, a removable disk cartridge and a disk cartridge player. The removable disk cartridge includes a platter having top and bottom surfaces. The top surface includes an optically readable medium having digital information stored therein, and the bottom surface includes electronic circuitry for processing the stored information. The electronic circuitry includes interface circuits for receiving signals from, and transmitting signals to, circuitry which is not on the disk cartridge. The electronic circuitry is powered through contacts on the disk cartridge from a source in the disk player. The disk player includes circuitry for sending signals to, and receiving signals from, the disk cartridge. The disk player also includes the read head for reading the information stored on the top surface of the disk cartridge and circuitry generating signals indicative of that information and coupling the signals in question to the disk cartridge. In one embodiment of the present invention, the signals between the disk cartridge and the circuitry in the disk player are communicated by generating light pulses that are transmitted through the spindle on which the disk cartridge rotates.

DETAILED DESCRIPTION OF THE INVENTION

Figure 1:
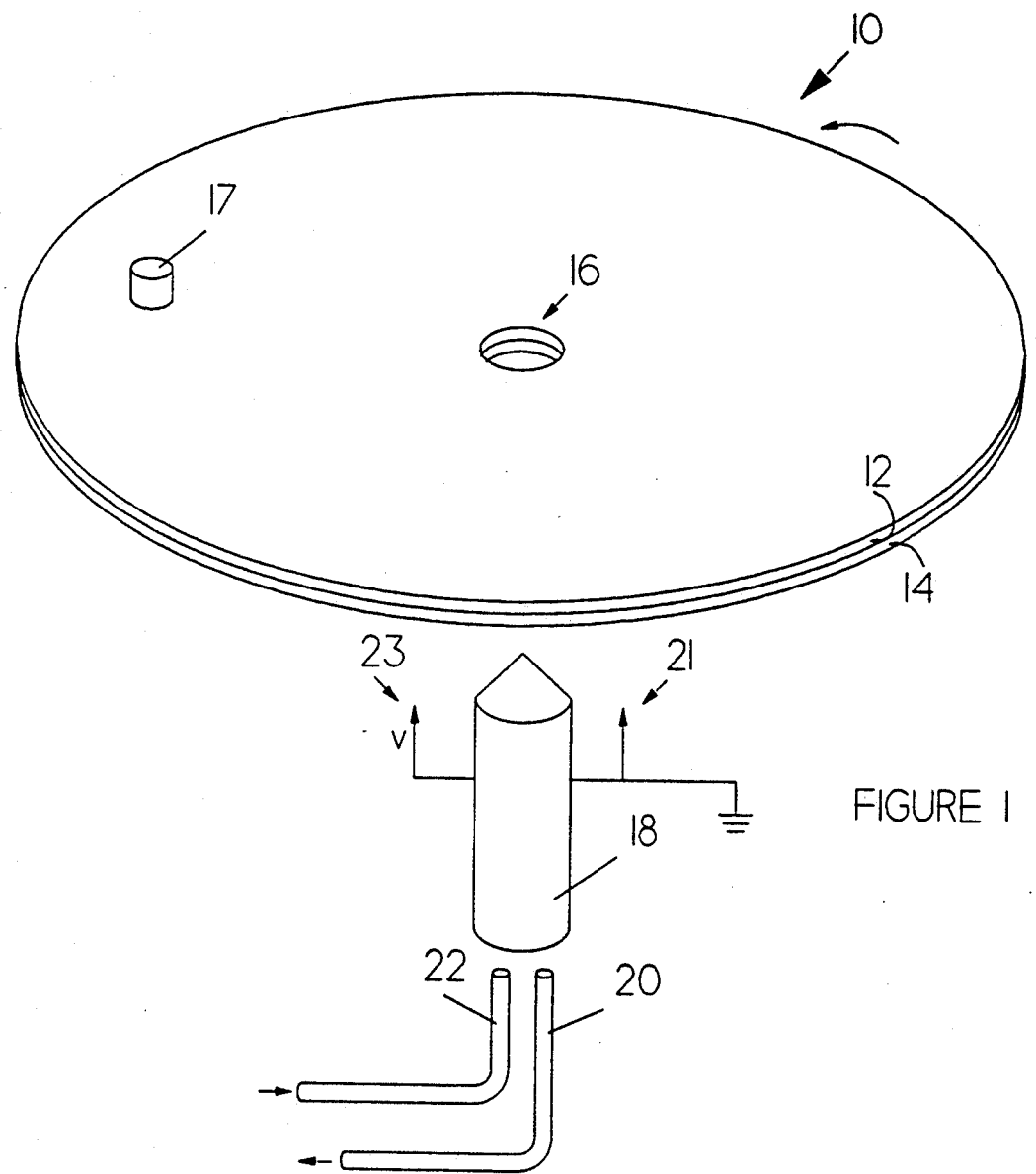
FIG. 1 is prospective view of a removable cartridge according to the present invention and the spindle on which it rotates.
Figure 2:
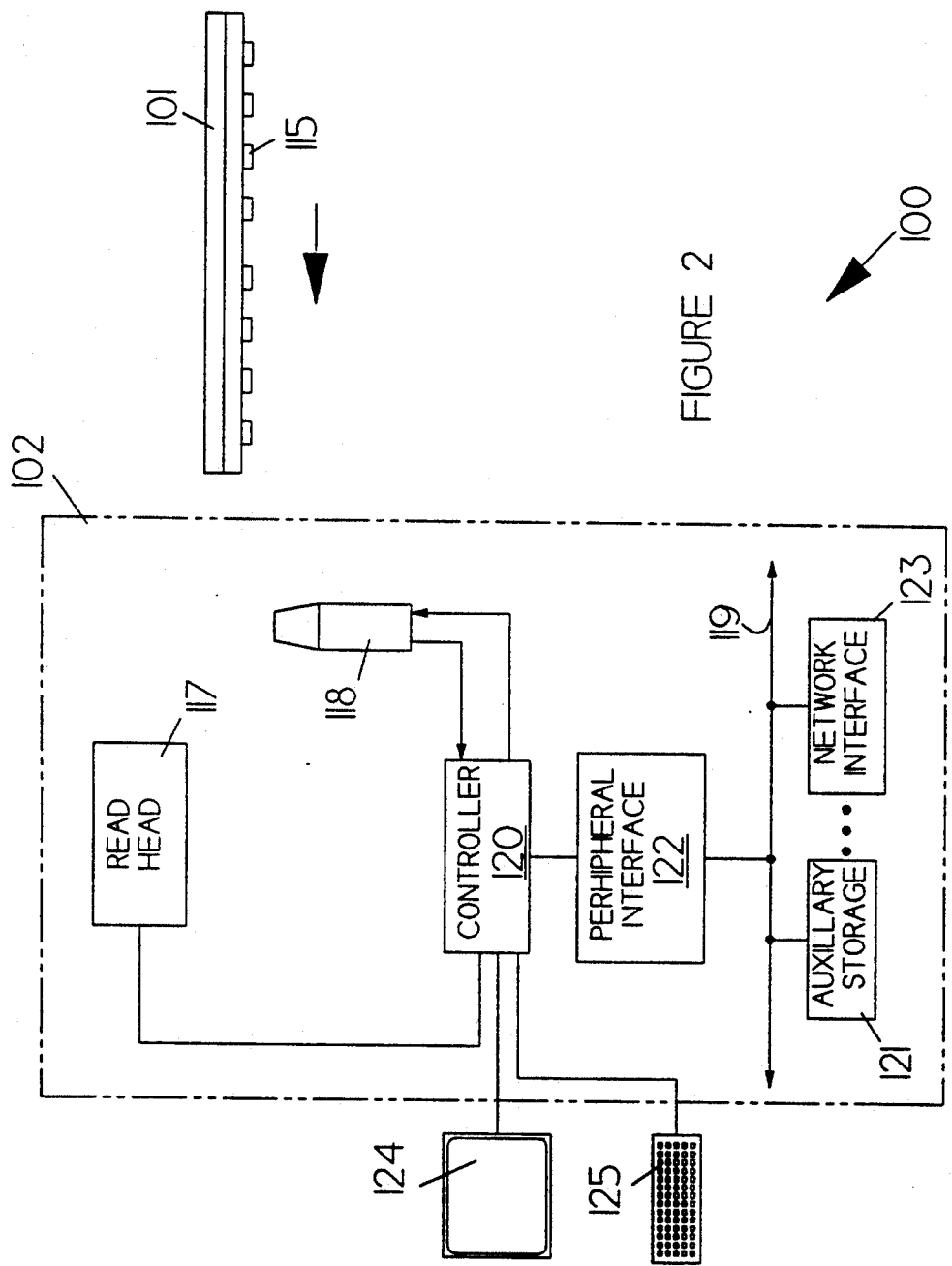
FIG. 2 is a block diagram of a computer system according to the present invention.

The present invention is based on a new form of removable cartridge disk drive in which the removable cartridge includes both the means for storing data and hardware for processing the data stored thereon. The basic features of a computer system according to the present invention are shown in FIGS. 1 and 2. FIG. 1 is prospective view of a removable cartridge 10 and the spindle 18 on which it rotates. Removable cartridge 10 may be viewed as comprising a platter having a top layer 12 which provides storage space for data and a bottom layer 14 which includes active circuitry for processing the data. For the purpose of this discussion, it is to be understood that "data" may include programs.

Top layer 12 preferably operates in a manner similar to a conventional optical disk drive. Such a layer includes a storage medium having properties that may be sensed by a read head 17. The properties are typically the optical transmissivity or index of refraction of the storage medium. Read head 17 may also include circuitry for writing data into the storage medium. Optical storage media that allow one or more write operations are conventional in the art, and hence, will not be discussed in detail here.

Bottom layer 14 includes circuitry for processing the data stored in top layer 12. This circuitry is powered by contacts included in spindle 18. Typical contacts are shown schematically at 21 and 23. Information bearing signals are preferably coupled to the circuitry in question via optical fibers 20 and 22 which transmit and receive light pulses via spindle 18. The manner in which power and information signals are coupled to the circuitry on the bottom layer will be explained in more detail below.

The manner in which a computer system 100 according to the present invention operates may be more easily understood with reference to FIG. 2 which is a block diagram of such a computer system. Computer system 100 comprises a disk player 102 and a removable cartridge 101. Disk player 102 provides the components of computer system 100 that are least likely to be replaced or outmoded. Removable cartridge 101 includes those components of computer system 100 whose lifetime is relatively short because of improvements in hardware or software. When system upgrades are needed, removable cartridge 101 is replaced by another removable cartridge having the upgrades in question.

Disk player 102 may be used with a variety of removable cartridges. The different cartridges may have different operating systems and/or different hardware. Often significant improvements in computer throughput may be obtained by utilizing a computer architecture that is specifically optimized for the task at hand. For example, large database processing systems may benefit from content addressable memory or other parallel processing techniques. While graphics workstations may be optimized using a different form of parallel processor and/or memory configuration. The present invention allows the user to easily change "computers" when the particular focus of the user changes while preserving the remainder of the computer system. This arrangement is significantly more economical than maintaining a number of separate computer systems.

In addition, the present invention assures that the software included on the removable cartridge and the computing hardware are always properly configured for one another. In the present invention, the software on the top surface of removable cartridge 101 need function only with the hardware on the bottom surface of removable cartridge 101. When hardware upgrades are needed, the entire removable cartridge is replaced with a new removable cartridge having software specifically configured for the new hardware. Hence, the computer user is relieved of the burdensome task of reconfiguring software whenever the user upgrades the computing hardware.

Another advantage inherent in a computer system according to the present invention is the portability of the computer system. A user need only transport the removable cartridge between locations having disk players according to the present invention. In prior art systems, a user having an operating system on a transportable storage medium needs to have computing systems with compatible hardware at each location. Since these prior art systems include the components that were most likely to change over time, it is difficult to guarantee that the systems remain compatible with the operating system even when the systems were initially setup to be compatible. Furthermore, if a user needs to use different computing systems for different aspects of the user's work, the user needs to have one of each of the different types of computing systems at each location when using prior art systems. With the present invention, the user only needs to have one disk player.

In the preferred embodiment of the present invention, the active circuitry 115 on the bottom surface of removable cartridge 101 includes essentially all of the high-speed computer circuitry such as the central processing unit, fast memory, and video display processors including the VRAM associated therewith. The upper surface of removable cartridge 101 is used to store the operating system, system data, and a variety of programs for use by the computer user. The upper surface may also include user data and, as will be explained in more detail below, storage space which may be written by the user.

Disk player 102 includes the mechanism for reading data from the upper surface of removable cartridge 101 and for interfacing the active circuitry 115 on the bottom surface of removable cartridge 101 to other components of the computer system. The operation of disk player 101 is coordinated by a controller 120 which provides the interface between active circuitry 115 and the other components of computer system 100 such as monitor 124, keyboard 125, and peripheral interface 122 for controlling other common computer components connected to bus 119 such as the auxiliary disk storage shown at 121 and a network interface shown at 123. Controller 120 also operates the read head 117 and provides the communication between active circuitry 115 and read head 117. As will be explained in more detail below, this communication is preferably accomplished by transmitting light signals through spindle 118 on which removable cartridge 101 rotates when inserted into disk player 102.

Figure 3:
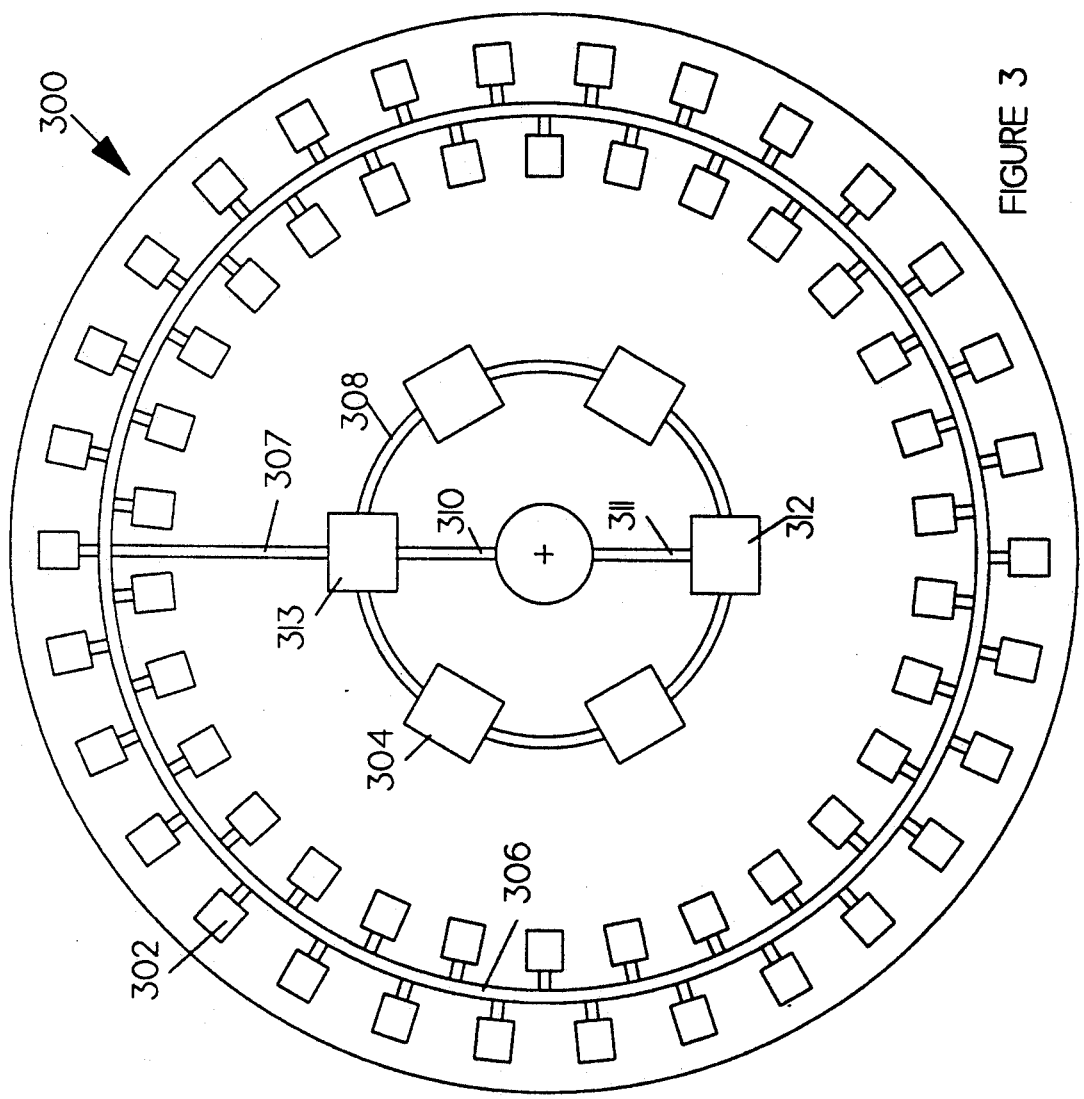
FIG. 3 shows an exemplary arrangement of active circuit elements on the bottom surface of a removable cartridge according to the present invention.

FIG. 3 shows an exemplary arrangement of active circuit elements on the bottom surface of a removable cartridge 300 according to the present invention. The circuit elements may be general purpose computing elements, memory elements, etc. Exemplary circuit elements are shown schematically at 302 and 304. The circuit elements are connected via buses such as busses 306-308. The size and speed of the buses are matched to the circuit elements on removable cartridge 300. Methods for mounting integrated circuit chips directly on a planar surface are known to those skilled in the circuit arts, and hence, will not be discussed in more detail here. An example of such a mounting technique is provided in flip-chip solder bump attachment methods to high density substrates such as multiplayer ceramics or copper polyimide thin films.

The circuit elements preferably receive data from sources remote from the bottom surface of removable cartridge 300 via an optical 310 which terminates on an interface circuit 313. Similarly, the circuit elements preferably send data to remote locations via an optical path 311 with the aid of an interface circuit 312 that converts the electrical signals on bus 308 to optical signals. Optical paths 310 and 311 interface with the spindle on which removable cartridge 300 rotates. The manner in which this interface is accomplished will be discussed in more detail below. Similarly, power for the circuit elements on removable cartridge 300 is received from connections on the spindle. The power connections to the various buses have been omitted to simplify the drawing.

Figure 4:
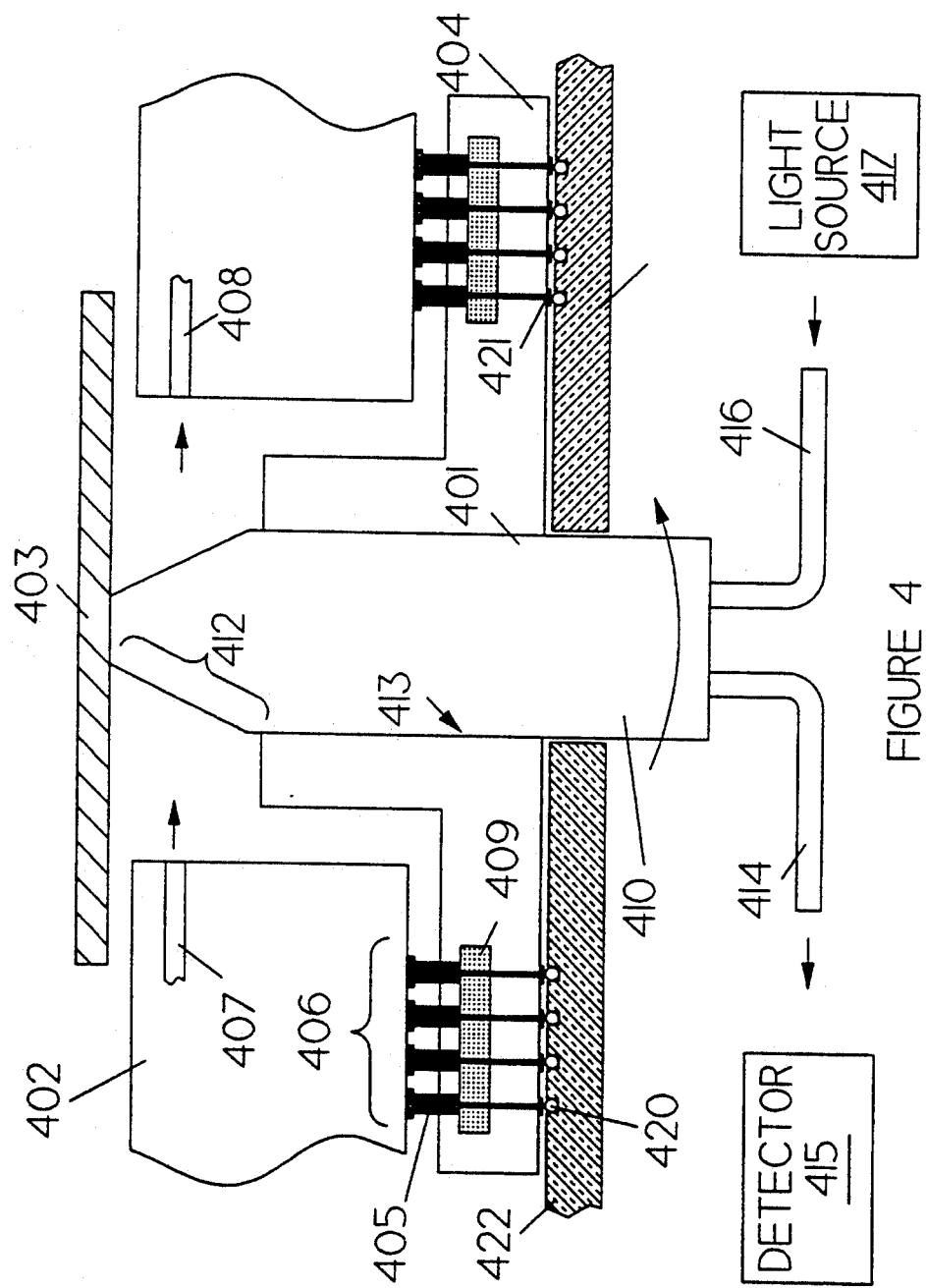
FIG. 4 is a cross-sectional view of a portion of the hub of a removable cartridge and the spindle mechanism in one embodiment of a computer system according to the present invention.

The manner in which connections are preferably made between the spindle and the removable cartridge in the present invention may be more easily understood with reference to FIG. 4 which is a cross-sectional view of a portion of the hub of a removable cartridge 402 according to the present invention and the spindle mechanism on which it rotates. The spindle mechanism includes a spindle 401 which is connected to an adapter 404 which rotates with spindle 401. Power is supplied to a set of contacts 406 on the underside of removable cartridge 402 via a corresponding set of pins 405 which make contact with said contacts when removable cartridge 402 is seated in the spindle mechanism and hold-down flange 403 is engaged. The pins are compressed against the corresponding contacts by an expansion mechanism 409 which preferably comprises a compressible material. Power is supplied to the pins via extensible connections to a set of corresponding contacts 421 on the underside of adapter 404 which make contact with a set of stationary contacts 420 on the upper surface of a stationary section 322. The stationary contacts 420 are preferably circular rings on which the contacts 421 ride when the spindle mechanism rotates. Electrically conducting lubricants are normally used to reduce wear between the stationary and moving contacts. Such mechanisms are conventional in the electrical mechanical arts, and hence, will not be described in more detail here.

The optical signals to be inputted to the active circuitry on removable cartridge 402 are generated by a light source 417 and are coupled to optical fiber 408 via spindle 401. Spindle 401 is preferably constructed from a material that is transparent at the wavelength of the light generated by light source 417. The signals from light source 417 are injected into the end of spindle 401 via light pipe 416. The signals in question traverse the length of spindle 401 and illuminate region 412 at the top of spindle 401. A portion of the light is captured by optical fiber 408 which transmits the light in question to an interface circuit included in the active circuitry on removable cartridge 402. It will be apparent to those skilled in the art that light source 417 must be of sufficient intensity to provide a detectable signal after the losses due to the relatively small solid angle subtended by the end of optical fiber 408. Alternative coupling methods having lower light losses will be described below; however, in practice it is found that the light losses are acceptable.

Signals to be sent from the active circuitry to the controller in the disk player are converted to optical signals which are transmitted via optical fiber 407.

Light from optical fiber 407 strikes the angled region 412 of spindle 401. The angle of region 412 is chosen such that light striking this region from optical fiber 407 will be refracted. The angle of the refracted light beam in spindle 401 is controlled by the angle between region 412 and the light leaving optical fiber 407 and the index of refraction of the medium from which spindle 401 is constructed. The angle is chosen such that the refracted light beam will be totally reflected by the vertical walls 413 of spindle 401. A portion of the refracted light is captured by light pipe 414 which applies the captured light to detector 415.

It should be noted that light loses in the transmission of signals from removable cartridge 402 to detector 415 are more critical than light losses between light source 417 and optical fiber 408 because the power available to generate light signals on removable cartridge 402 is significantly less than the power available in the disk player. The need to minimize the power dissipation on removable cartridge 402 places restraints on the amount of light that can be generated by the interface circuitry on removable cartridge 402. Hence, light losses cannot be easily overcome by increasing the intensity of light generated on removable cartridge 402. The light losses inherent in the arrangement shown in FIG. 4 are much less for a light signal from removable cartridge 402 to detector 415 than for a light signal from light source 417 to optical fiber 408 because essentially all of the light leaving light fiber 307 is captured by spindle 401. Hence, most of light losses result mainly from the inability of light pipe 414 to collect all of the light leaving the bottom of spindle 401. These light losses may be minimized by utilizing light collection mechanisms at the end of spindle 401. For example, the diameter of light pipe 414 may be increased so as to collect the majority of the light leaving the end of spindle 401.

Figure 5:
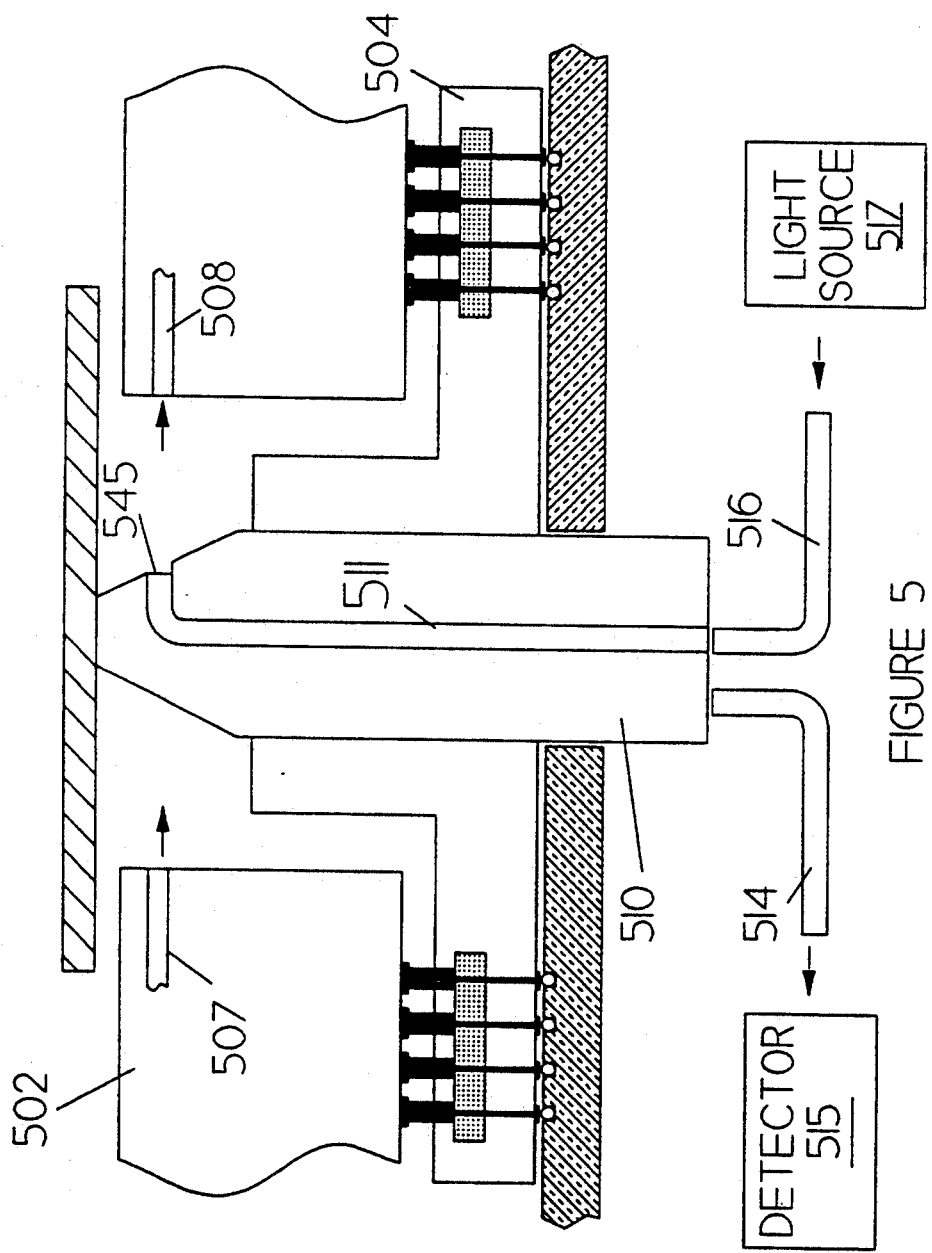
FIG. 5 is a cross-sectional view of a portion of a hub of a removable cartridge and an alternate spindle mechanism for use in a computer system according to the present invention.

As noted above, the light losses from light source 417 to optical fiber 408 are normally acceptable. However, in those cases in which light losses between light source 417 and light fiber 308 are too large, the configuration shown in FIG. 4 may be replaced by the configuration shown in FIG. 5. Those components shown in FIG. 5 which serve the same functions as components shown in FIG. 4 are numbered with similar numbers. The spindle embodiment shown in FIG. 5 differs from that shown in FIG. 4 in that the spindle 510 includes an axially placed light pipe 511 having an end 545 aligned with light fiber 508 which receives light signals generated by light source 517. Light source 517 delivers light signals to the other end of light pipe 511 via light pipe 516. The diameters of light pipe 511 and optical fiber 508 are selected such that optical fiber 508 collects most of the light leaving light pipe 511. This embodiment requires that end 545 and light fiber 508 be aligned with respect to one another. This alignment may be maintained by including a detent in removable cartridge 502 which engages a positioning mechanism in spindle 504 thereby assuring the desired alignment. Since such alignment mechanisms increase the complexity and cost of the system, the embodiment shown in FIG. 4 is preferred.

While the present invention may be utilized with an optical medium that may only be written once at the time of system integration, it will be apparent to those skilled in the art that embodiments of the present invention which include provisions for the user to write data into the upper surface of the removable cartridge are also possible. Optically based read/write disks are known to the arts. Hence, an embodiment of the present invention in which the removable cartridge utilizes an optically writeable material can provide a medium in which the user can also write and read data to be processed by the active circuitry on the removable cartridge.

Figure 6:
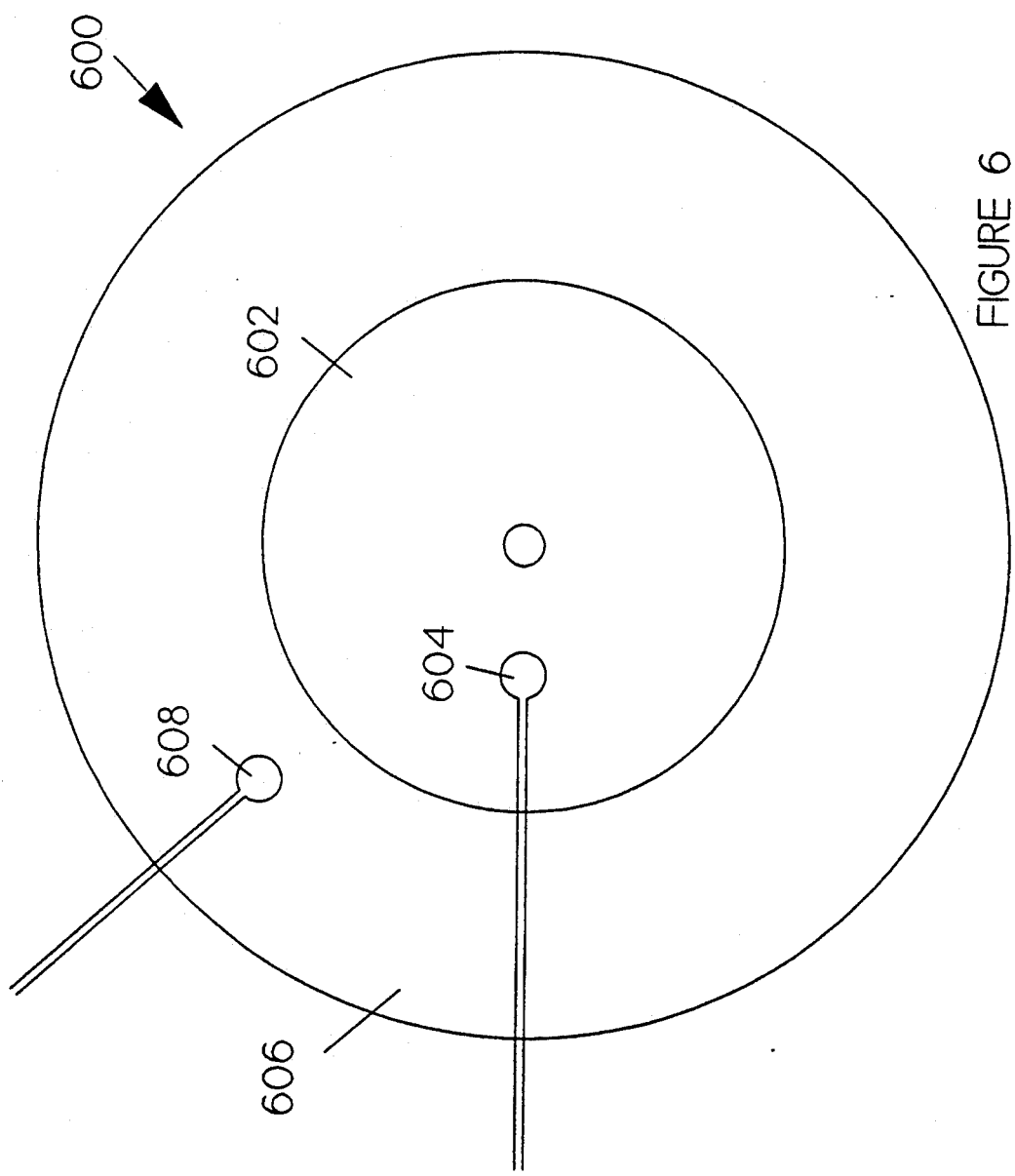
FIG. 6 is a top view of a removable cartridge according to the present invention which utilizes two different storage media.

In addition, the upper surface of the removable cartridge may be constructed from a plurality of data storage materials. An exemplary embodiment of a removable cartridge according to the present invention which utilizes two different storage media is shown at FIG. 6. Removable cartridge 600 includes an inner region 602 which is constructed from a medium that may be read and written using optical methods. This region is accessed by an optical read/write head 604. Removable cartridge 600 also includes an outer region 606 which comprises a conventional magnetic material which is read and written by a magnetic read/write head 608. In this embodiment, the controller in the disk player controls both the magnetic and optical read/write heads. Signals from the active circuitry on the bottom surface of the removable cartridge determine which read/write heads are utilized. Embodiments having more than two regions on the removable cartridge will be apparent to those skilled in the art.

It should be noted that certain types of optically written read/write disks, as well as conventional magnetic disks, rely on magnetic fields to write the storage medium. These magnetic fields can interfere with the operation of the active components on the underside of the removable cartridge. In embodiments which utilize such media, the active circuitry can be positioned such that the circuitry does not underlie these regions or the regions are separated in a manner which prevents interference from the magnetic fields in questions. In the preferred embodiments of the present invention that utilize such multi-media removable cartridges, optical read/write technologies that avoid the use of magnetic fields are preferred. Such read/write optical disks are known to the art. For example, U.S. Pat. No. 5,051,950, discloses a read/write optical disk technology based on ferro-electric materials in which no magnetic fields are needed to read or write the storage medium.

While the embodiments of the present invention described above utilized a removable cartridge that rotates in the disk player, it will be apparent to those skilled in the art that embodiments in which the removable cartridge remains stationary in the disk player may also be constructed. In such embodiments, the light beam that is used for reading and/or writing the optical storage medium is caused to scan the appropriate portion of the upper surface of the removable cartridge. Such scanning systems are known to those skilled in the art of "flying spot" scanners. Some of these systems utilize moving mirrors to deflect a laser beam to the appropriate location on the surface. The light reflected from the surface is then collected by a lense which focuses the light on a detector. Alternatively, cathode ray tubes of various designs may be used in conjunction with an imaging lense to illuminate the desired area on the surface of the removable cartridge.

In the preferred embodiments of the present invention, the removable cartridge is constructed such that the data stored thereon may also be read in conventional optical disk drives. This provides a means for accessing the data when a disk player according to the present invention is not available.

The above-described embodiments of the present invention utilized an arrangement in which data read from the top surface of the removable cartridge is transmitted to the active circuitry on the bottom surface thereof with the aid of a controller via optical paths through the spindle of the disk player. This arrangement requires a high speed data path extending from the read head to the active circuitry on the bottom surface of the removable cartridge. Such high speed data paths increase the cost of the disk player and may become obsolete as higher speed disk drives and active circuitry become available.

Figure 7:
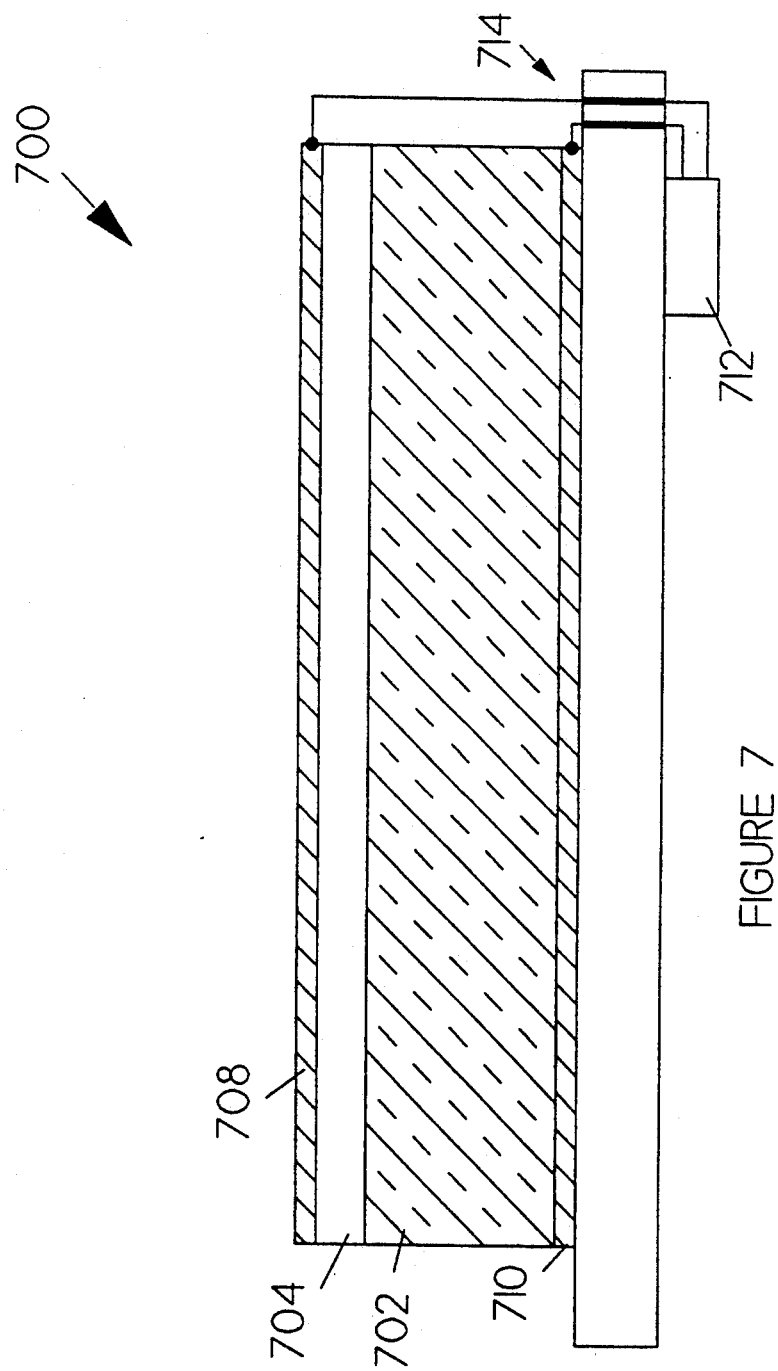
FIG. 7 is a cross-sectional view of an embodiment of the present invention that utilizes ferro-electric read/write media to eliminate the need to transmit data stored on the top surface of the removable cartridge to the bottom surface of the removable cartridge via signal paths that leave the removable cartridge.

An alternative embodiment of a removable cartridge according to the present invention that does not require an external high speed data path is shown in FIG. 7 at 700. This embodiment is based on a read/write optical disk disclosed in U.S. Pat. No. 5,051,950 which is herein incorporated by reference. Optical disk 700 stores information by altering the polarization of a ferro-electric layer 702. The polarization is altered by switching a voltage across the ferro-electric layer at the location corresponding to the bit being written. This is accomplished by illuminating the location in question with a laser which causes a photoconductive layer 704 to become conductive thereby switching a voltage from electrode 708 to the surface of the ferro-electric layer at the location in question. The direction of the electric field applied across the ferro-electric layer determines the direction of polarization of the ferro-electric material. Hence, a one may be stored by switching a voltage of V onto electrode 708 and illuminating the bit location in question, and a zero may be stored by switching a voltage of $-V$ onto electrode 708 and illuminating the bit location. Once the polarization of the ferro-electric material has been set, the direction of polarization at any location can be sensed by illuminating the location in question and measuring the photo-current that flows between electrodes 708 and 710. The direction of flow of the photo-current between these electrodes indicates the direction of polarization of the storage media at the location in question.

In this embodiment of the present invention, the circuitry 712 for operating electrodes 708 and 710 to write data into the ferro-electric layer 702 are part of the active circuitry on the bottom surface of the removable cartridge. In addition, this circuitry includes a sensor for measuring the current flowing between electrodes 708 and 710 in response to the illumination of a bit location on the removable cartridge. This circuitry may directly be connected to the electrodes via conductors from the bottom surface of the removable cartridge to the top surface such as those shown at 714. Hence, the need for a high speed optical signal path from the removable cartridge to the read/write head in the disk player is avoided. In this embodiment of the present invention, the disk player need only position the laser over the appropriate track to enable the active circuitry on the removable cartridge to read and write data on the top surface of the removable cartridge. This further reduces the cost of the disk player and extends the useful lifetime of a disk player, as the player does not require high speed buses which become obsolete as technological advances increase the computer processor speeds.

While the above identified embodiments have referred to "top" and "bottom" surfaces of the removable cartridge as the regions for storing information and containing the processing circuitry, respectively, it will be apparent to those skilled in the art that the roles of the top and bottom surfaces could be reversed. In addition, it will be apparent to those skilled in the art that active circuitry could be included on the side of the platter that includes the optical storage media. Such one sided embodiments are particularly attractive in large scale integrated circuits in which the optical storage media may be deposited on the same substrate as that used to construct the active circuitry. The key feature of the present invention is the combination of an optical storage region for storing data and an active circuitry region for processing the data.

There has been described herein a novel computer system based on a removable cartridge which includes active circuitry for processing data stored thereon. Various modifications to the present invention will become apparent to those skilled in the art from the foregoing description and accompanying drawings. Accordingly, the present invention is to be limited solely by the scope of the following claims.

What is claimed is:

1. A disk cartridge for the storage and processing of information, said disk cartridge comprising a platter having storage and processing regions, said storage region comprising an optically readable medium having digital information stored therein and said processing region comprising electronic circuitry for processing said stored information.

2. The disk cartridge of claim 1 further comprising first and second optical paths for transmitting light pulse to and from, respectively, said electronic circuitry.

3. The disk cartridge of claim 2 wherein said disk cartridge further comprises means for mounting said cartridge on a rotating spindle, said first and second optical paths being positioned on said cartridge so as to receive and transmit, respectively, light pulse from light guides in said spindle.

4. The disk cartridge of claim 1 wherein said storage region further comprises a region of optically readable and writeable storage media.

5. The disk cartridge of claim 1 wherein said storage region further comprises a region of magnetically readable and writeable storage media and wherein said electronic circuitry on said processing region is positioned such that said magnetically readable and writeable storage media does not overlie said electronic circuitry.

6. A computer system comprising a removable disk cartridge and a disk cartridge player, said removable disk cartridge comprising a platter having storage and processing regions, said storage region comprising an optically readable medium having digital information stored therein and said processing region comprising electronic circuitry for processing said stored information, said electronic circuitry comprising means for receiving signals from, and transmitting signals to, circuitry which is not on said disk cartridge and first and second power terminals for providing power to said circuitry, said disk cartridge player comprising:
   means coupling power to said first and second power terminals;
   means for sending signals to said receiving means;
   means for receiving signals from said transmitting means; and
   means for illuminating a selected region on said storage region to enable the reading of information stored in said optically readable medium.

7. The computer system of claim 6 wherein said illuminating means comprises means for causing said removable cartridge to rotate on a spindle under a light source, wherein said means for sending signals to said receiving means comprises an optically transparent region in said spindle.

8. The computer system of claim 7 wherein said means for receiving signals from said transmitting means comprises an optically transparent region in said spindle.

9. The computer system of claim 6 wherein said illuminating means further comprises means for reading the information stored in said optically readable medium, means for generating signals indicative of said read information, and means for coupling said generated signals to said sending means.

10. The computer system of claim 6 wherein said removable cartridge further comprises a writeable storage medium on said storage region and wherein said disk player further comprises means for writing said writeable storage medium in response to signals received from said electronic circuitry.

11. A disk player for actuating a removable disk cartridge comprising a platter having storage and processing regions, said storage region comprising an optically readable medium having digital information stored therein and said processing region comprising electronic circuitry for processing said stored information, said electronic circuitry comprising means for receiving signals from, and transmitting signals to, circuitry which is not on said disk cartridge, said disk player comprising:

means coupling power to said removable disk cartridge;

means for sending signals to said removable disk cartridge;

means for receiving signals from said removable disk cartridge; and means for illuminating a selected region on said storage region to enable the reading of information stored in said optically readable medium.

12. The disk player of claim 11 wherein said illuminating means comprises means for causing said removable cartridge to rotate on a spindle under a light source, wherein said means for sending signals comprises an optically transparent region in said spindle.

13. The disk player of claim 12 wherein said means for receiving signals comprises an optically transparent region in said spindle.

14. The disk player of claim 11 wherein said illuminating means further comprises means for reading the information stored in said optically readable medium, means for generating signals indicative of said read information, and means for coupling said generated signals to said sending means.

15. The disk player of claim 11 wherein said removable disk cartridge further comprises a writeable storage medium on said storage region and wherein said disk player further comprises means for writing said writeable storage medium in response to signals received from said electronic circuitry.

* * * * *

REEXAMINATION CERTIFICATE (3147th)

United States Patent [19]

Feamster et al.

[11] B1 5,235,586

[45] Certificate Issued Mar. 4, 1997

[54] COMPUTER SYSTEM UTILIZING COMPACT INTELLIGENT DISKS

[75] Inventors: Scott Feamster, Atherton; Keith Klemba, Santa Clara, both of Calif.

[73] Assignee: Hewlett-Packard Company, Palo Alto, Calif.

Reexamination Request:
No. 90/003,625, Nov. 7, 1994

Reexamination Certificate for:
Patent No.: 5,235,586
Issued: Aug. 10, 1993
Appl. No.: 802,207
Filed: Dec. 4, 1991

[51] Int. Cl.[6] .................................................. G11B 7/24
[52] U.S. Cl. .................... 369/100; 369/112; 369/124; 369/77.2; 369/272; 369/273
[58] Field of Search .................................. 257/678, 679; 365/226, 122; 364/708.1, 709.1; 369/100, 124, 112, 77.2, 272, 273; 360/633

[56] References Cited

U.S. PATENT DOCUMENTS

| 4,575,621 | 3/1986 | Dreifus . | |
|---|---|---|---|
| 4,581,716 | 4/1986 | Kamiya | 364/708 |
| 4,766,480 | 8/1988 | Hamada | 257/679 |
| 4,792,843 | 12/1988 | Haghiri-Tehrani et al. | 257/679 |
| 4,814,924 | 3/1989 | Ozeki . | |

FOREIGN PATENT DOCUMENTS

| 0158906 | 10/1985 | European Pat. Off. . |
| 60-15880 | 1/1985 | Japan . |

OTHER PUBLICATIONS

"Magnetic Recording Disk File with Silicon Substrate Disk Containing Both Integrated Electronic Circuits and Magnetic Media" IBM Technical Disclosure Bulletin, vol. 28, No. 7, Dec. 1985.

*Primary Examiner*—Georgia Yvonne Epps

[57] ABSTRACT

A computer system comprising a removable optical disk having active circuitry thereon and a disk player is disclosed. The optical disk includes a storage medium for storing data on one side and active circuitry for processing the data on the other side. The disk cartridge includes most of the high speed components of the computer system, while the disk player includes those components which are least likely to change over time. By combining the active circuitry with the data and programs to be processed thereby on a single disk cartridge, the problems associated with maintaining and configuring the system are substantially reduced compared to prior art systems.

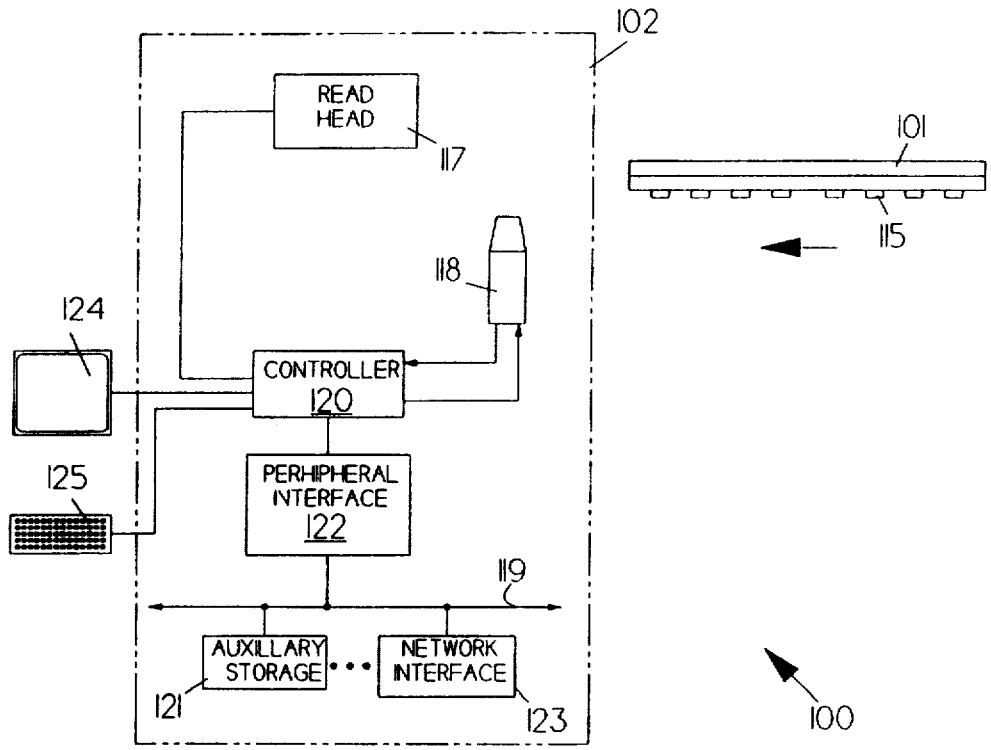

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-6, 9-11, 14 and 15 are cancelled.

Claims 7 and 12 are determined to be patentable as amended.

Claims 8 and 13, dependent on an amended claim, are determined to be patentable.

7. [The computer system of claim 6] *A computer system comprising a removable disk cartridge and a disk cartridge player, said removable disk cartridge comprising a platter having storage and processing regions, said storage region comprising an optically readable medium having digital information stored therein and said processing region comprising electronics circuitry for processing said stored information, said electronic circuitry comprising means for receiving signals from, and transmitting signals to, circuitry which is not on said disk cartridge and first and second power terminals for providing power to said circuitry, said disk cartridge player comprising:*

*means for coupling power to said first and second power terminals;*

*means for sending signals to said receiving terminals;*

*means for receiving signals from said transmitting means; and*

*means for illuminating a selected region on said storage region to enable the reading of information stored in said optically readable medium,* wherein said illuminating means comprises means for causing said removable cartridge to rotate on a spindle under a light source, wherein said means for sending signals to said receiving means comprises an optically transparent region in said spindle.

12. [The disk player of claim 11] *A disk player for actuating a removable disk cartridge comprising a platter having storage and processing regions, said storage region comprising an optically readable medium having digital information stored therein and said processing region comprising region comprising electronic circuitry for processing said stored information, said electronic circuitry comprising means for receiving signals from, and transmitting signals to, circuitry which is not said disk cartridge, said disk player comprising:*

*means for coupling power to said removable disk cartridge;*

*means for sending signals to said removable disk cartridge;*

*means for receiving signals from said removable disk cartridge; and*

*means for illuminating a selected region on said storage region to enable the reading of information stored in said optically readable medium,* wherein said illuminating means comprises means for causing said removable cartridge to rotate on a spindle under a light source, wherein said means for sending signals comprises an optically transparent region in said spindle.

* * * * *